United States Patent [19]

Herud

[11] Patent Number: 4,488,838

[45] Date of Patent: Dec. 18, 1984

[54] PROCESS AND APPARATUS FOR FEEDING PARTICULATE MATERIAL INTO A PRESSURE VESSEL

[75] Inventor: Frank R. Herud, Williamsville, N.Y.

[73] Assignee: Textron Inc., Providence, R.I.

[21] Appl. No.: 381,409

[22] Filed: May 24, 1982

[51] Int. Cl.³ .............................................. B65G 53/48
[52] U.S. Cl. ......................................... 406/56; 165/65
[58] Field of Search ................. 406/53, 55, 56, 197, 406/1; 414/218; 165/65

[56] References Cited

U.S. PATENT DOCUMENTS

| | | |
|---|---|---|
| 1,798,857 | 3/1931 | Tyler ................................. 406/56 X |
| 3,225,821 | 12/1965 | Sollich ............................... 165/65 X |
| 3,309,736 | 3/1967 | Rodenacker ....................... 165/65 X |
| 4,206,610 | 6/1980 | Santhanam ........................ 406/197 X |

Primary Examiner—Jeffrey V. Nase
Assistant Examiner—L. E. Williams
Attorney, Agent, or Firm—Bean, Kauffman & Bean

[57] ABSTRACT

An improved method and apparatus for feeding a crushed or pulverized solid supply material such as coal or the like, from a supply source under ambient pressure into a reactor or the like which is under significantly higher pressure; such as in connection with a hydrogenation/oxidation process producing so-called "fuel" or "synthesis" gases. A liquefied gas such as carbon dioxide or the like, is fed under pressure into a moving supply of such materials (as may be contained in a closed casing screw conveyor/extruder or the like) in order to form a slurry which is suitable to be pumped into the receiver against its superior pressure. Process temperatures are so controlled that as the input liquefied gas component of the slurry migrates toward the lower pressure feed inlet end of the conveyor in response to the superior pressure at the discharge end of the conveyor, it solidifies into solid particles which intermingle with and substantially fill the interstices between the supply material particles. There is thus provided a pressure differential "block" which opposes the higher reactor pressure such as would otherwise cause gas blow-backs through the supply material system; and therefore the need for intermediate pressure-lock devices is obviated.

Ancillary means for efficient supply/recovery/reuse of the slurrying gas and heat transfer supply liquids involved in the process are also disclosed.

8 Claims, 9 Drawing Figures

COAL AND $CO_2$ VAPOR
STATION 2

COAL, $CO_2$ SOLID AND $CO_2$ VAPOR
STATION 3

LEGEND

- COAL
- $CO_2$ LIQUID
- $CO_2$ SOLID
- $CO_2$ VAPOR

COAL, $CO_2$ VAPOR AND $CO_2$ LIQUID
STATION 4

COAL AND $CO_2$ LIQUID
STATION 5

COAL, $CO_2$ LIQUID AND $CO_2$ VAPOR
STATION 6

COAL AND $CO_2$ VAPOR
STATION 7

PROCESS AND APPARATUS FOR FEEDING PARTICULATE MATERIAL INTO A PRESSURE VESSEL

BACKGROUND OF THE INVENTION

This invention relates to the problem of feeding crushed or pulverized supply material, such as coal or the like (as distinguished from lump coal or the like) from a supply source operating under ambient pressure into a reactor which is operating at a significantly higher pressure. The prior art typically employs either lock hoppers (when working with dry supply material), or slurry systems. For example, lock hoppers comprising a series of pressure locks, operating intermittently and sequentially in connection with systems pumping dry supply material up to reactor pressure are disclosed in U.S. Pat. No. 3,976,443. A major problem of such lock hopper systems is due to rapid deterioration of the cycling hopper valves while working upon the dry erosive supply material.

Slurry systems working with coal employ either a hydrocarbon liquid or water, and for liquefaction processes in which oil is a product of the process this system is generally satisfactory. However, for processes where the product is a gas such as in coal gasification, the use of oil in the slurry would be prohibitively inefficient. Therefore, water slurries have been utilized extensively for such purposes as disclosed by way of example in U.S. Pat. No. 3,976,443. However, as explained in that same patent, the presence of water in the feed mix, due to its high rate of vaporization, reduces the thermal efficiency of the process. Furthermore, the temperatures required for later evaporation of the water content tend to cause the coal to soften, and this in consequence inhibits both the coal dry flow characteristics as well as the process reactions. U.S. Pat. No. 4,261,705 also discloses a supply material handling system which is subject to the same criticisms, and in any case would be applicable only to handling large-sized "lump" coal or the like, as distinguished from methods such as may be suitable when working with crushed or pulverized coal.

BRIEF SUMMARY OF THE INVENTION

The present invention eliminates the need for usage of water as a slurrying agent. Dry, crushed or pulverized solid carbonaceous supply material is transported continuously, such as within a closed casing feed screw conveyor/extruder from a supply hopper under ambient pressure either into a pressurized supply tank, or directly into a downstream process. A liquefied gas, such as carbon dioxide or the like is slurried into the dry supply material during its progress through the conveyor toward the higher pressure zone of the conveyor output. A fraction of the liquefied gas input backtracks through the supply material toward the lower pressured conveyor inlet, and by expansion and cooling progressively solidifies into solid particles which intermingle with and substantially fill the interstices between the supply material particles as they progress through the conveyor, thereby providing a pressure block preventing reactor gas blow-backs through the conveyor from the higher pressurized end of the system.

Under optimum control conditions, the supply material, as it approaches the conveyor discharge, contains only sufficient carrier gas for dense phase pneumatic transport of the material to the intermediate receiver tank or to the downstream process. Any remaining excess liquefied gas may be removed from the supply material approaching the delivery end of the conveyor by heating the conveyor casing and the slurry therein, so as to vaporize the residual liquid and to thus force the liquid/vapor to flow back upstream through the downstream flowing slurried material.

For supply materials which are of such specific particle size and surface characteristics as would inhibit such liquefied gas upstream back flow, an external heat exchanger and cyclone separator may be utilized to separate the excess carrier gas from the supply material.

DETAILED DESCRIPTION

Figure 1:
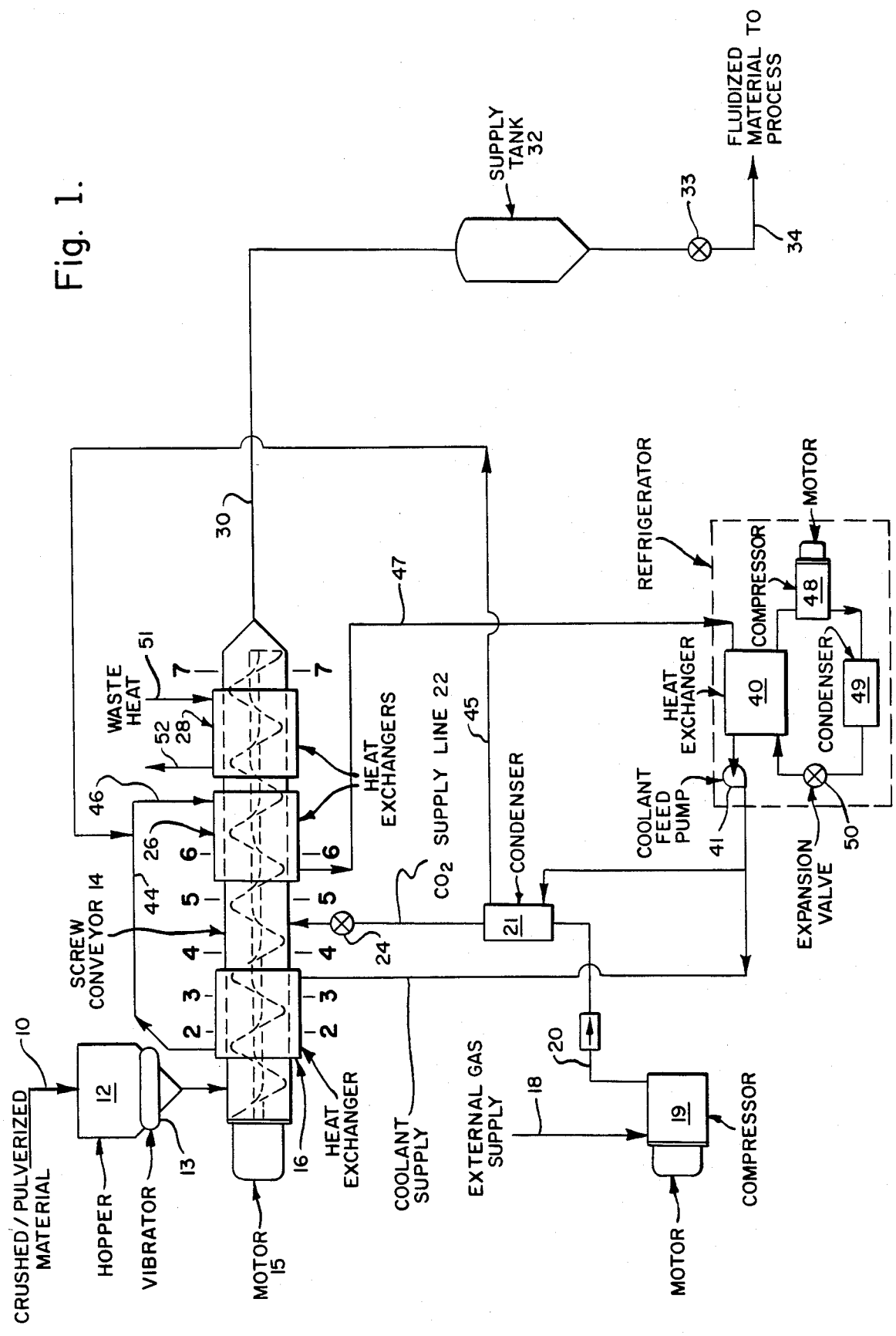
FIG. 1 is a schematic flow sheet illustrating one preferred form of process for performing the invention.
Figure 2:
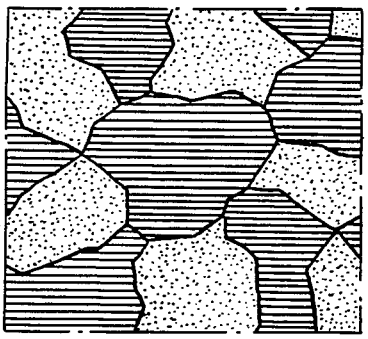
FIG. 2 is a greatly enlarged fragmentary sectional view of a minute portion of the conveyor supply mass; illustrating the relative status of the then solidified carbon dioxide and the coal components of the mass as it passes through the conveyor system such as at station 2 (section 2—2) of FIG. 1.
Figure 3:
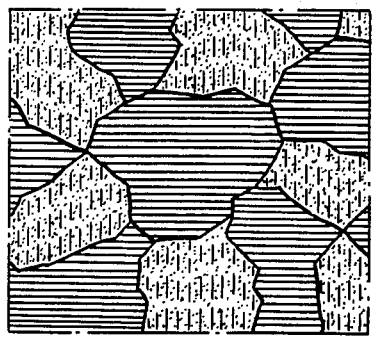
FIG. 3 is a view similar to FIG. 2 but illustrates how the contents of the supply mass at station 3 of the drawing distinguish from its contents at station 2.
Figure 4:
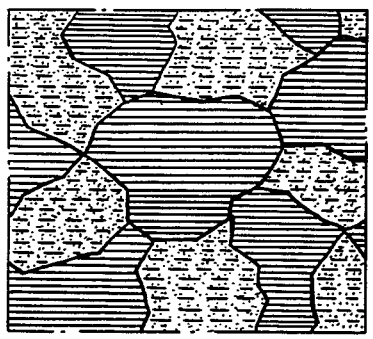
FIGS. 4, 5, 6 and 7 are similar to FIGS. 2 and 3, and illustrate how the characteristics of the carbon dioxide content of the supply mass changes as the supply mass travels from station to station as the supply pressurizing input process progresses; as is illustrated overall at FIG. 1.
Figure 5:
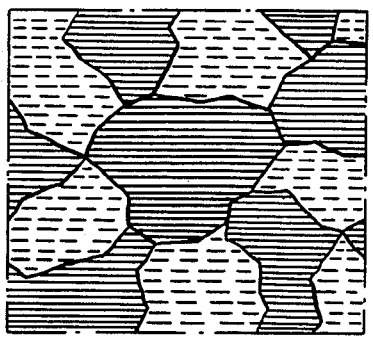
Figure 6:
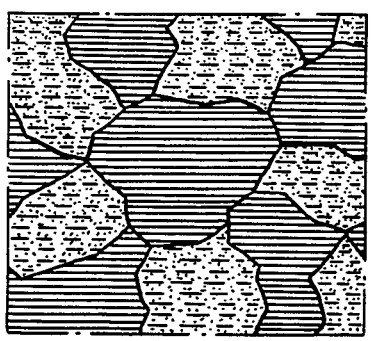
Figure 7:
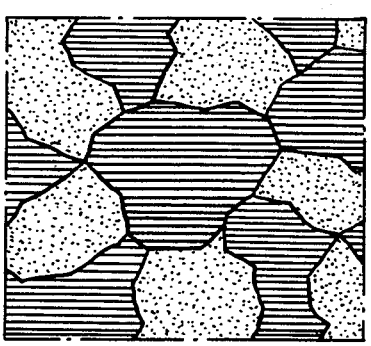

With reference to schematic FIG. 1, dry crushed or pulverized supply material, such as coal, is transported such as through a conduit or chute 10 into hopper 12. Hopper 12 is at atmospheric temperature and is vented to atmospheric pressure. Hopper 12 feeds the material into the supply opening of a screw extruder type conveyor 14. Vibrating means such as shown at 13 may be employed if required in association with the hopper feed discharge line so as to insure continuous material feed and also to increase the bulk density of the input material. The conveyor is shown as being driven by electric motor 15 which may be coupled thereto by either a fixed or variable speed drive system. Adjacent its feed inlet end, the barrel of the screw conveyor 14 is jacketed as indicated at 16 to insure cooling of the material as it is mechanically transported towards the other end of the barrel by the action of the rotating screw. The cooling jacket 16 covers sufficient surface area of the conveyor barrel so that the temperature of the material being conveyed in that portion of the barrel may be maintained to within the range of ambient to $-50°$ F. If preferred, the supply material temperatures reduction may be started in the hopper 12 and/or in the feed line, such as by the application of coolers to those elements of the system.

Liquid carbon dioxide at a temperature range of between ambient and $-60°$ F. is injected into the screw conveyor barrel between stations 4 and 5 as shown herein, at a flow rate slightly greater than that required for dense phase pneumatic transport, while the liquid carbon dioxide pressure is maintained to be equivalent or less than the pressure downstream of the conveyor.

The selected temperature of the injected carbon dioxide and the temperature of the supply material at the injection point should be as high as possible consistent with the supply material characteristics, system operation, and the operating pressures in order to minimize the process cost of the carbon dioxide and feed material refrigeration.

As shown herein, the liquid carbon dioxide may be furnished by an external gas supply line 18; compressor 19; line 20; condenser 21; and line 22, under control of a valve 24. The liquid carbon dioxide is thus mixed into the supply material moving through the conveyor while a component thereof diffuses upstream from the downstream section thereof and counter to the downstream mechanically driven supply material particles to form a slurry therewith. This liquid slurry system operates to set up a block preventing downstream gas from blowing back into the feed line and/or into the hopper 12. The liquid carbon dioxide component of the slurry tends to migrate towards the inlet end of the conveyor whereupon it expands and cools and thereupon solidifies as it encounters the lower pressures existing adjacent the inlet end of the conveyor, and thus plugs the interstices between the mechanically being transported coal (or other) feed particles which are being forwarded into the higher pressure reactor (or into some intermediate storage chamber).

Supplementing the basic process, adjacent to the discharge end of the conveyor 14, heat exchanger jackets as shown at 26 and 28 may be provided about the conveyor barrel, so that from within these zones of the conveying process any remaining liquid carbon dioxide may be vaporized. Such vaporization thereof typically decreases the density of the carbon dioxide in the mix; and a positive pressure gradient may be formed in the material while moving as illustrated herewith between stations 5 and 7 of the conveyor barrel and conduit 30 and supply tank 32, by properly orificing the conduit 30. The higher downstream pressure forces a mixture of gaseous and liquid carbon dioxide to flow upstream through the supply material which is being frictionally driven downstream by the screw of the conveyor. This action is independent of any internal fluid differential pressure forces. Thus, the only remaining gas entrained in the mass of supply material adjacent the outlet end of the conveyor is minimal and fills the interstices between the supply material particles, and this will vary with the temperature and pressure conditions currently prevailing relevant to conduit 30 and supply tank 32.

The requisite amount of carbon dioxide supply into the system is equivalent to that which will be only the amount required for dense phase pneumatic transport of the supply material into the downstream process. Therefore, this augments the efficiency of the overall system. Typically, liquid carbon dioxide is added at approximately $-50°$ F. and at a pressure at or near reactor pressure, such as 200 to 1000 psi, or greater. For a pressure of 700 psi for example, approximately 0.11 lbs. of carbon dioxide per pound of coal would be added to attain the dense phase pneumatic transport effect of the invention. Under varying conditions, consistent with supply material physical characteristics; system operation requirements; operating pressure; as well as the overall economics of the feed system, it may be desirable to inject the carbon dioxide at lower than reactor pressure and to pump the resultant slurry up to reactor pressure in the conveyor. The process of the present invention accommodates such methods of operation. The thus fluidized supply material may be controlled to flow from tank 32 such as through a valve 33 and line 34 into the high pressure end material process; such as may comprise a coal gasifier reactor, or the like.

The heat exchanger and condenser coolant supply for the system may be furnished such as by a heat exchanger 40 and pump 41 as shown herein. Typically, a type $-70°$ F. methylene chloride coolant may be employed and supplied by the illustrated pump 41 to the heat exchanger 16, and then to the condenser 21. If required, reverse flow heat exchangers may be employed to increase the methylene chloride temperature to such as $+40°$ F.; such as are illustrated at 16 and 21. The coolant then flows from lines 44 and 45 into line 46 which supplies the heat exchanger 26. Preferably, the coolant temperature is thereupon reduced in exchanger 26 to approximately $-20°$ F., and then flows through line 47 to the heat exchanger 40. By this means, methylene chloride temperature is reduced from $-20°$ F. to $-70°$ F. by a refrigeration system such as is illustrated to comprise a motor driven compressor 48; condenser 49; and an expansion valve 50.

Figure 8:
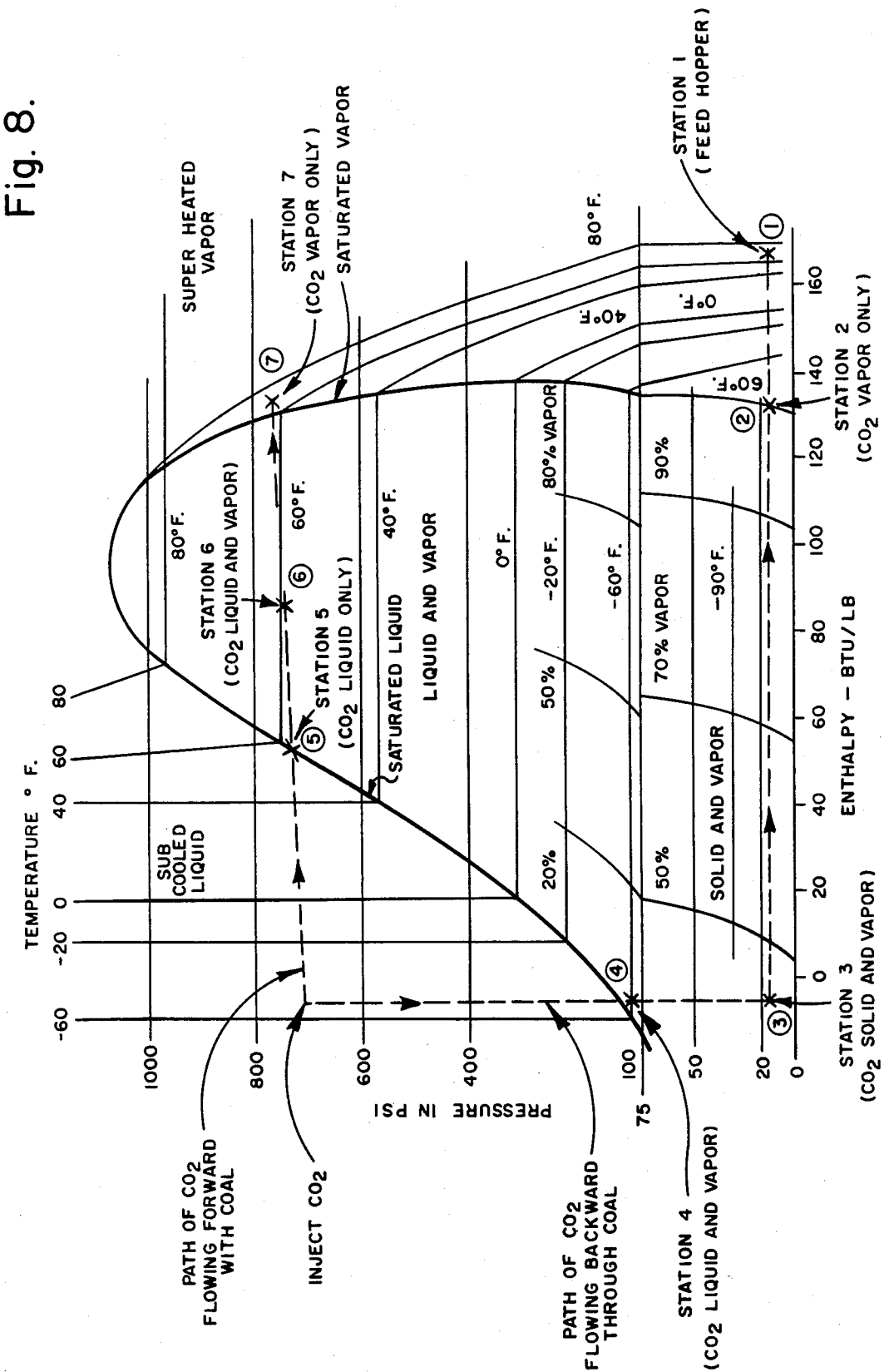
FIG. 8 is a pressure enthalpy diagram illustrating the thermodynamic states of the carbon dioxide content of the mix as it progresses through the conveyor component of the system.

Heating of the supply mass and carrier fluid in order to insure that the carrier fluid is in the superheated gas state at the outlet of the heat exchanger 28 (e.g., a minimum of $+55°$ F. for carbon dioxide at 700 psi) can be accomplished by employing relatively low temperature heat supplying fluids furnished by "waste heat" as is available as an incident to the process. For example, $+55°$ F. water may be supplied via conduit 51 to the exchanger 28 and returned via conduit 52. Superheating the supply mass and carbon dioxide content to temperatures exceeding the aforesaid minimum would however be preferred so as to minimize the potential for gas condensations downstream of the heat exchanger 28. FIG. 8 of the drawing herewith is a pressure enthalpy diagram illustrating the thermodynamic states of the carbon dioxide content of the mix as it progresses through the conveyor component of the system.

Figure 9:
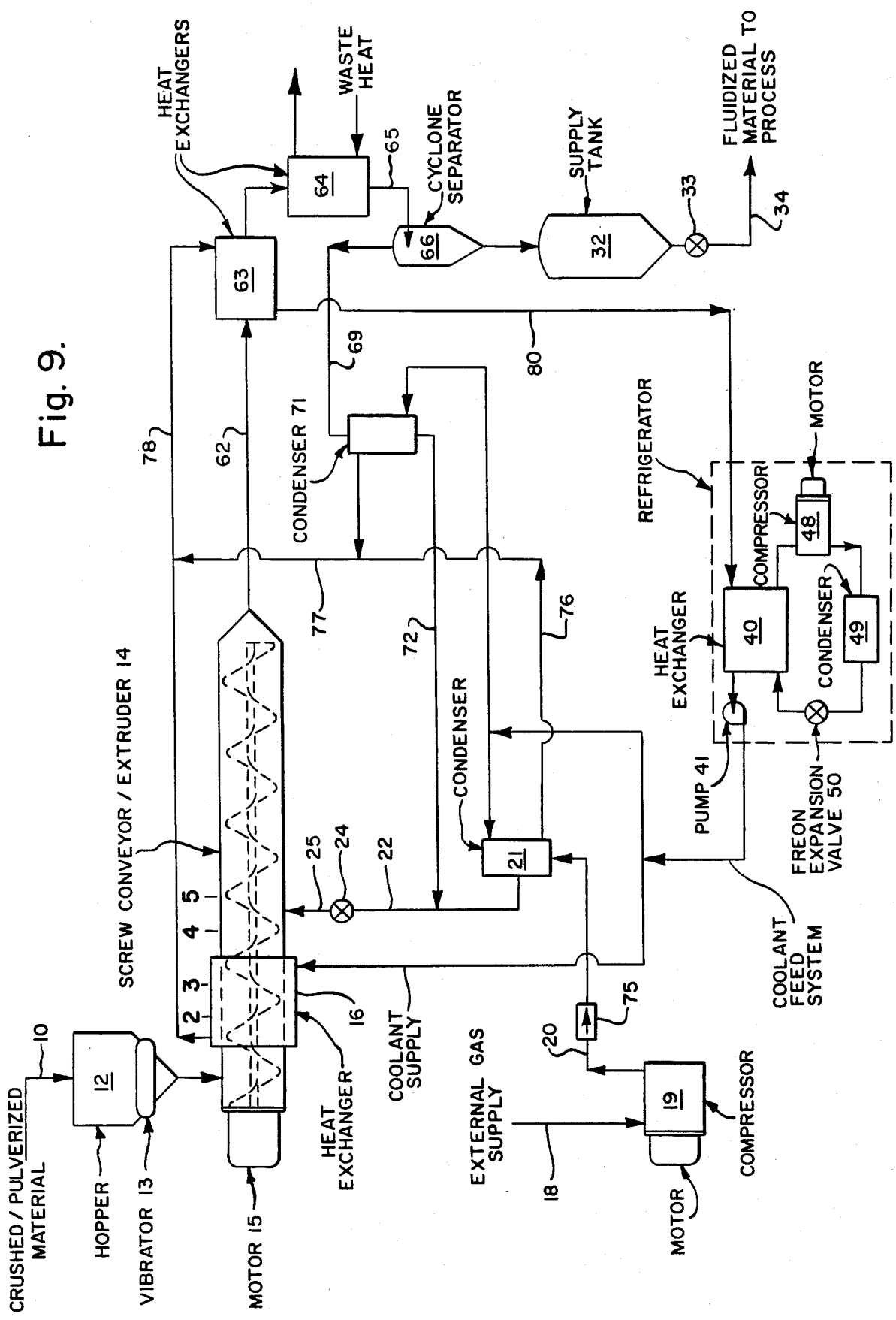
FIG. 9 is a flow sheet schematic of another preferred form of the process embodying the invention.

When working on supply materials which are of particle size and surface characteristics such as would inhibit liquefied gas counter flow, as described hereinabove, an external heat exchanger and cyclone may be used to separate the excess carrier gas from the supply material, as is illustrated by FIG. 9 of the drawing herewith. As shown in this case, the system is generally similar to that of FIG. 1 in that the major components thereof are alike and are identified by like numbers. Wherein differences do occur, the components and system arrangements thereof are identified by different numerals.

As in the case of FIG. 1, the supply material is mechanically conveyed through the barrel of the screw conveyor 14 past an inlet or manifold supplied by line 22, valve 24, and line 25. Liquid carbon dioxide at a temperature between ambient and $-60°$ F. is supplied by line 22 and as in the case of FIG. 1 is mixed into the supply material slurrying and forming a block preventing downstream gas from blowing back into the feed line and/or into hopper 12. Also as in FIG. 1, the carbon dioxide migrating towards the inlet solidifies and forms an additional plug. As in the case of FIG. 1, it is desired for economic reasons to minimize the cooling of the supply material and inject the carbon dioxide at as high a temperature as possible. Sufficient liquid carbon dioxide is added through line 22 so that a pressure of up to 1000 psi or greater can be achieved downstream of the screw extruder. As in the case of FIG. 1, it may be desired to inject the carbon dioxide at a lower pressure and pump the slurry to reactor pressure. The typical range of liquid carbon dioxide required is approximately 0.17 to 0.30 pounds per pound of coal or 15 to 25% of the weight of the material moved through the screw conveyor.

The slurry of liquid carbon dioxide and supply material completes travel through the conveyor into a discharge line 62 and then through heat exchanger jackets 63,64. The extruder is designed to pump the slurry to a discharge pressure above the carbon dioxide inlet pressure for the purpose of providing a pressure level consistent with that required to recirculate excess carbon dioxide back to the conveyor through condenser 71 and lines 69 and 72. The heat exchangers raise the slurry temperature so that the subcooled liquid carbon dioxide is heated first to near saturated liquid temperature in 63 and then to superheated gas in 64.

The carbon dioxide gas and supply material flows from heat exchanger 64 through line 65 to a cyclone separator 66. The action of the cyclone separator permits part of the gaseous carbon dioxide to be removed from the fuel material/gas mixture. The amount of gaseous carbon dioxide removed in the cyclone separator is equal to the difference in the amount necessary to form a supply material/liquid carbon dioxide slurry and the amount needed to provide dense phase pneumatic transport of the material as explained hereinabove. For an example when working with pulverized coal, if the gas pressure in line 65 is of the order of 700 psi, approximately 0.24 pounds of liquid carbon dioxide per pound of pulverized coal would be added through line 25 to form the slurry. Of this, 0.11 pounds of carbon dioxide per pound of coal would be needed to fluidize the dry coal delivered to the process and 0.13 pounds of carbon dioxide per pound of coal would be removed by the cyclone separator and returned to the conveyor.

The fluidizing gas and supply material from the cyclone separator flows into the supply tank 32 and from there through valve 33 and line 34 to the high pressure process, such as to a coal gasifier reactor. The gaseous carbon dioxide removed in the cyclone separator passes through line 69 and condenser 71, and is then returned as liquid carbon dioxide through line 72 for reinjection into the conveyor 14. The pressure drop through lines 62, 65, 69 and 72, through heat exchangers 63 and 64 and through cyclone 66 is equivalent to the pressure rise added to the slurry by the extruder. The amount of carbon dioxide that exists from the system into the downstream process is made up from the external carbon dioxide supply 18. If necessary, the external carbon dioxide supply is compressed by compressor 19 to the pressure necessary for carbon dioxide feed through line 22. The compressed carbon dioxide flows through line 20 and check valve 75 to the condenser 21 and is liquefied to provide liquid carbon dioxide feed through line 22, valve 24 and line 25, mixing with the returned carbon dioxide through line 72 to provide the total carbon dioxide required for the slurry.

The heat exchanger and condenser coolant is supplied by the heat exchanger 40 and pump 41. Typically, −70° F. methylene chloride coolant is supplied by the pump 41 to the heat exchanger 16 and the condensers 71 and 21. The reverse flow heat exchanger increases the methylene chloride temperature to approximately +40° F. in exchangers 16, 71 and 21. The coolant stream then flows through lines 76 and 77 to line 78 which supplies heat exchanger 63. The coolant temperature is reduced while passing through exchanger 63 to approximately −20° F., and flows through line 80 to the heat exchanger 40. The methylene chloride temperature is reduced in exchanger 40 from −20° F. to −70° F. by the cooling effects supplied by the refrigeration system of compressor 48; a condenser 49 and an expansion control valve 50.

The heating of the solid supply material and carrier fluid mix is adjusted so that the carrier fluid is in the form of superheated gas at the outlet end of heat exchanger 63 (e.g., minimum +55° F. for carbon dioxide at 700 psia) can be obtained by employing "waste heat". For example, hot water could be employed as a heating source. Superheating the fuel mass and carbon dioxide to temperatures exceeding the minimum would be desirable to minimize the potential for condensation downstream of the heat exchanger 64.

What is claimed is:

1. A process for continuously feeding a finely particulate solid supply material such as coal or the like from a relatively low pressure ambience into a pressure vessel under higher pressure, said process comprising:

mechanically transporting said supply material through an enclosing barrel from a lower pressure inlet end thereof to a high pressure discharge end thereof which is in flow communication with said pressure vessel, while heating said barrel adjacent to said discharge end; and supplying throughout the process a liquefied carrier gas under pressure into the interior of said barrel intermediate said inlet and discharge ends, wherein said liquefied gas is fed into said barrel at a rate such as to form a liquid slurry with said supply material within an intermediate portion of said barrel;

some portion of said liquefied gas being forced to advance upstream through the interstices of said supply material towards said inlet end in response to higher pressure existing at said discharge end;

whereupon said portion of said liquefied gas cools by expansion and solidifies into solid particles which cooperate with said supply material being mechanically moved through said barrel so as to form a block against pressure differential induced fluid flow towards said inlet end in response to the higher pressure at said discharge end.

2. A process as set forth in claim 1, wherein the temperature of said supply material moving through said barrel is reduced prior to introduction of said liquefied carrier gas into the interior of said barrel.

3. A process as set forth in claim 1 wherein said mechanical transporting of said supply material is performed by means of a conveyor of the barrel-encased screw extruder type.

4. A process as set forth in claim 1 wherein said liquefied gas is a gas selected from the group including carbon dioxide; propane; ammonia; freon, and the like.

5. A process as set forth in claim 1 wherein said liquefied gas is carbon dioxide.

6. A process as set forth in claim 5 wherein excess carbon dioxide above that required for dense phase pneumatic transport of said supply material downstream of said barrel is removed by heating the carbon dioxide contents of the materials passing through said barrel, while utilizing the higher downstream pressure to force a fraction of the resultant mixed carbon dioxide gas and liquefied carbon dioxide to flow upstream through said supply material which is being mechanically transported downstream through said barrel.

7. A process as set forth in claim 5 wherein the excess carbon dioxide is vaporized downstream of said barrel; then removed from the supply material by means of a cyclone separator; and then liquefied and reinjected into said barrel.

8. A process as set forth in claim 5 wherein said supply material is at ambient temperature at the point at which carbon dioxide is fed into said barrel and the carbon dioxide is as near ambient temperature as possible consistent with the material properties and operating pressure.

* * * * *